No. 888,797. PATENTED MAY 26, 1908.
H. G. FREW.
NUT LOCK.
APPLICATION FILED SEPT. 11, 1907.
Fig.1.
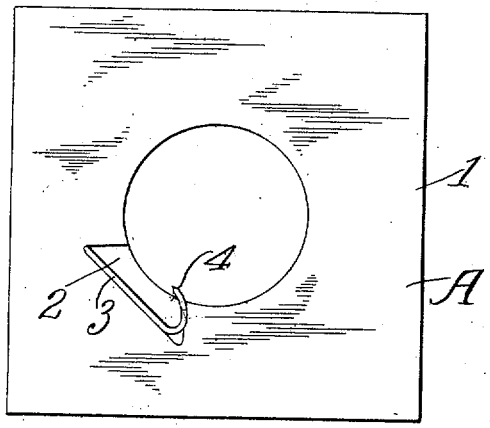
Fig.3.
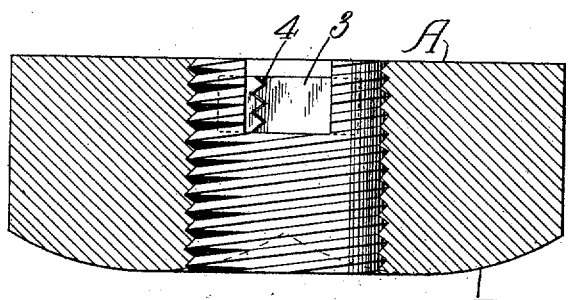
Fig.2.
Homer G. Frew,
Inventor
Witnesses
F. B. Wooden.
R. M. Elliott
By C. A. Snow & Co
Attorneys

UNITED STATES PATENT OFFICE.

HOMER G. FREW, OF NEW PHILADELPHIA, OHIO.

NUT-LOCK.

No. 888,797.　　　Specification of Letters Patent.　　　Patented May 26, 1908.

Application filed September 11, 1907. Serial No. 392,342.

*To all whom it may concern:*

Be it known that I, HOMER G. FREW, a citizen of the United States, residing at New Philadelphia, in the county of Tuscarawas and State of Ohio, have invented a new and useful Nut-Lock, of which the following is a specification.

This invention relates to nut locks.

The object of the invention is to provide a nut lock which shall be simple of construction, efficient and durable in use, and which shall be capable of being assembled with a bolt from either side. Furthermore, to provide a nut lock in which the locking element may be readily removed when destroyed or for other purposes, and which will firmly and effectively grip the bolt in such manner as to prevent accidental separation as from jars or vibrations but which will not interfere with the removal of the nut when proper pressure is applied thereto.

With the above and other objects in view as will appear as the nature of the invention is better understood, the same consists in the novel construction and combination of parts of a nut lock as will be hereinafter fully described and claimed.

In the accompanying drawings forming a part of this specification and in which like characters of reference indicate corresponding parts,—Figure 1 is a view in elevation of a nut lock constructed in accordance with the present invention. Fig. 2 is a vertical longitudinal sectional view through the nut exhibiting the locking element therein. Fig. 3 is a perspective detail view of the locking element.

The nut 1 may be of any preferred construction and is provided on one side with a trapezoidal-shaped seat 2 that may be of any depth and that intersects the threads of the nut, the two end walls of the seat being inwardly inclined toward each other at like angles, as clearly shown in Fig. 2.

Disposed within the seat is the locking element 3 which is constructed of a length of resilient metal, preferably of steel, and has one end curved or bent at an angle to its length and furnished with teeth 4 that are adapted to bite into the threads of the bolt when the nut is seated. As shown in Fig. 1, the locking element, which is approximately J-shaped is of a length to extend from end wall to end wall of the seat, and the teeth 4 project slightly beyond the wall of the bolt opening, in order to impinge against the threads of the bolt.

Where the nut is to be seated with the face A against the object to be clamped, the locking element will be positioned with the teeth 4 disposed, as indicated in Fig. 1, but where the face B is to bear against the object to be clamped, the locking element will be removed and its position transposed so as to cause the teeth 4 to project in the opposite direction.

It will be seen that when the nut is seated the pressure exerted on the teeth by the bolt threads will cause the end of the locking member to be flexed and thus allow the nut readily to pass over the threads of the bolt but on a reverse motion being imparted to the nut the teeth will bite into the bolt threads and thereby prevent disconnection of the nut. This gripping or biting action between the teeth of the locking element and the bolt is not such as will prevent the removal of the nut by a suitable implement, nor will such removal tend to strip the bolt threads and thus render the bolt useless, but the engagement between the locking element and the bolt will be positive in preventing accidental loosening or detachment of the nut. The cost of equipping a nut with the seat 2 will be but slight as it may be formed at the same time the bolt opening is stamped.

The improvements herein defined while simple in character will be found thoroughly effective for the purposes designed and will in a ready and practical manner secure the object sought.

What is claimed is:—

1. The combination with a nut provided in one face with a trapezoidal-shaped seat that intersects the bolt opening, of a locking element reversibly disposed within the seat, one end of the element being provided with a terminal disposed at an angle to the length thereof and projecting beyond the wall of the bolt opening, and the other end of the element being in engagement with one end wall of the seat.

2. The combination with a nut provided in one face with a trapezoidal shaped seat that intersects the bolt opening, of a J-shaped locking element reversibly disposed within the seat and extending from end wall to end wall thereof and having its curved terminal toothed end projecting into the bolt opening.

3. The combination with a nut provided in one face with a seat the two end walls of which are inwardly inclined toward each other at like angles, of a locking element reversibly disposed within the seat and extending from end wall to end wall thereof and having a toothed terminal projecting into the bolt opening.

In testimony that I claim the foregoing as my own, I have hereto affixed my signature in the presence of two witnesses.

HOMER G. FREW.

Witnesses:
    CHAS. H. HECK,
    MARGARET FREW.